UNITED STATES PATENT OFFICE.

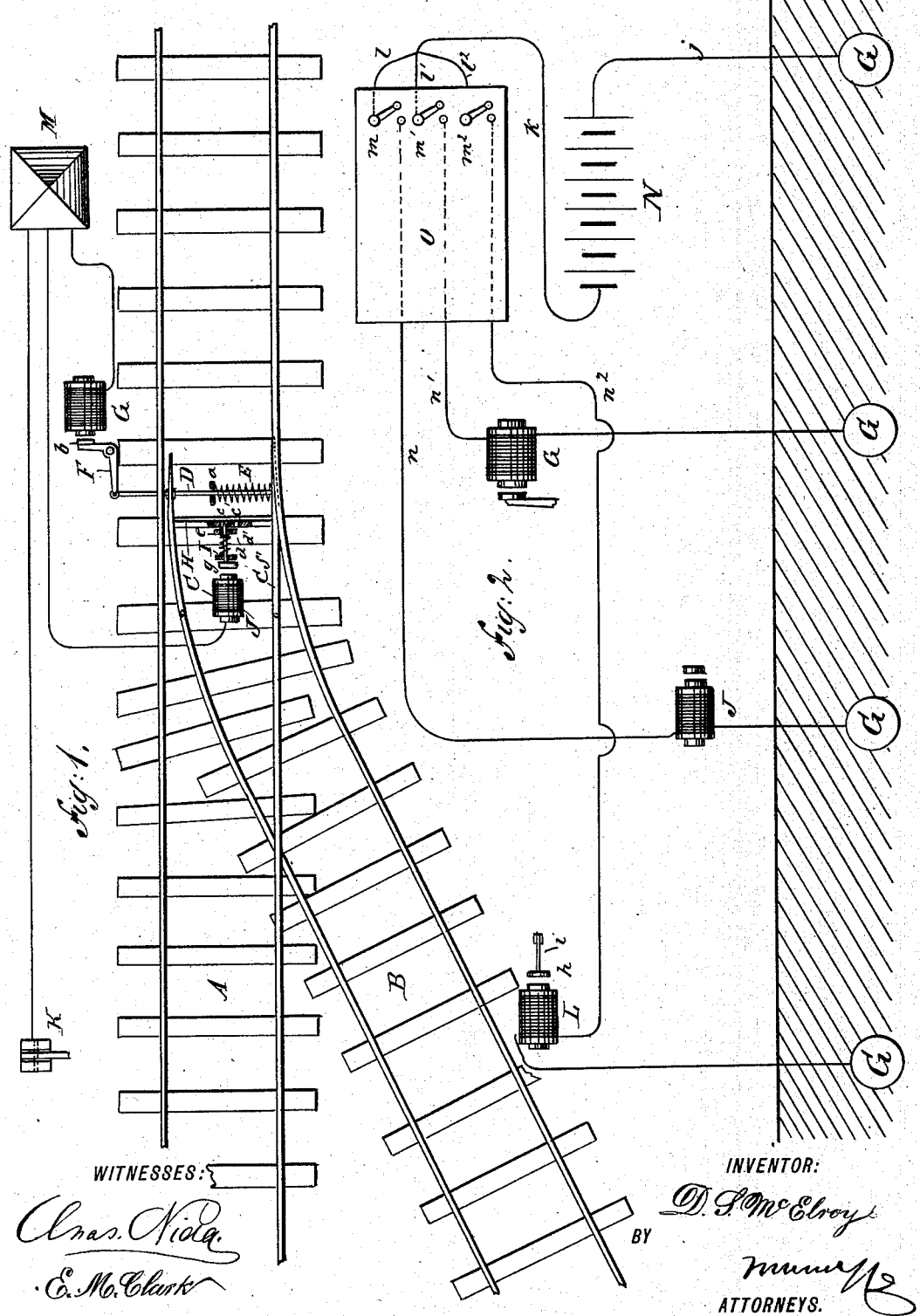

DANIEL S. McELROY, OF NEW YORK, N. Y.

ELECTRICALLY-OPERATED RAILWAY-SWITCH.

SPECIFICATION forming part of Letters Patent No. 413,412, dated October 22, 1889.

Application filed June 4, 1889. Serial No. 313,043. (No model.)

*To all whom it may concern:*

Be it known that I, DANIEL S. MCELROY, of the city, county, and State of New York, have invented a new and Improved Electrically-Operated Railway-Switch, of which the following is a specification, reference being had to the annexed drawings, forming a part thereof, in which—

Figure 1 is a plan view of a switch constructed according to my improvement, and Fig. 2 is a diagram of the circuits.

Similar letters of reference indicate corresponding parts in both views.

The object of my invention is to construct a railway switch and signal which may be operated entirely by means of electric currents, thereby reducing the labor required to operate the switches and insuring greater certainty in their action.

The invention consists in the particular construction and arrangement of parts, as hereinafter fully described, and pointed out in the claim.

The main track A and the side track B are provided with the spring switch-rails C C' in the usual way. These rails are connected near their points by a rod D, which extends through an eye $a$ and is surrounded by a spring E, placed between the said eye and the rail C'. The rod D is prolonged beyond the switch-rail C and pivotally connected to one arm of an angled lever F, the remaining arm being attached to the armature $b$, which is supported within the field of the electro-magnet G.

The bar H, connected with the rails C C', is provided with apertures $c$ $c'$. Near the bar H are arranged two apertured posts $d$ $d'$, through which extends a locking-bolt I. The bolt I is provided with a fixed collar $e$, between which and the post $d$ is placed a spiral spring $f$. The bolt I is provided with an armature $g$, which is arranged within the field of the electro-magnet J.

The switch signal or semaphore K is operated by an electro-magnet L, whose armature $h$ is connected with a cord or cable $i$, which extends to the semaphore-arm, and is adapted to move the same whenever the armature $h$ is drawn toward the magnet L.

In the switch-tower M is located a battery N and a switch-board O. One pole of the battery is grounded through the wire $j$, and the other is connected by a wire $k$ and the wires $l$ $l'$ $l^2$ with the switches $m$ $m'$ $m^2$, and the points of the said switches are connected, respectively, by wires $n$ $n'$ $n^2$, with the magnets J, G, and L, the said magnets being grounded in the usual way.

When it is desired to operate the railway-switch, the electric switch $m$ is brought into contact with the button at the terminal of the wire $n$, when the current flows from the battery N in one direction through the wire $k$, branch $l$, branch switch $m$, wire $n$, and magnet J, to the ground, and in the other direction through the wire $j$ to the ground. The magnet J being thus energized attracts the armature $g$ and withdraws the bolt I from the aperture $c$ in the bar H, thus releasing the switch, so that it may be moved by the operation of the magnet G, which is effected by turning the switch $m'$ so as to close the circuit on the wire $n'$, when the current will flow from the battery N in one direction through the wire $k$, the branch $l'$, the switch $m'$, the wire $n'$, and the magnet G to the ground, and in the opposite direction through the wire $j'$ to the ground, as before. The magnet G being thus energized attracts its armature $b$, tilting the lever F, thus drawing the bar D and moving the switch-rails C C' in opposition to the pressure of the spring E, when the switch is in position to cause the train to take the side track B. Immediately after turning the switch $m$ to operate the magnet G the switch $m^2$ is turned, thereby directing a current through the wire $n^2$ and the magnet L, thereby energizing that magnet and causing the armature $h$ to be drawn forward, thus operating a semaphore, indicating that the switch is open. When the switch is open, the bolt I drops into the aperture $c$ in the bar H upon breaking the circuit at the switch $m$. When it is desired to return the switch to its normal position, the electric switch $m$ is closed, thus causing the current to flow through the magnet J, the attraction of which draws forward the armature $g$ and withdraws the bolt I from the aperture c. Then the switch m' is turned, breaking the circuit of the magnet G, releasing the armature b, thus allowing the spring E to return the switch-rails to their normal position. The circuit of the magnet J is then broken by turning the switch $m^2$, when the spring f forces the bolt I into the aperture c of the bar H, thus locking the switch-rails in their normal position. After this has been done the circuit of the magnet L is broken by turning the switch $m^3$, when the semaphore drops to "safety" by its own gravity.

In the present case I have shown upon the switch-board only one series of electrical switches; but there will be one set of such switches for each railway-switch.

It is obvious that in lieu of the battery N I may employ any kind of an electric generator.

Having thus described my invention, I claim as new and desire to secure by Letters Patent—

The combination, with movable switch-rails, of a shifting-bar connecting the same, a spring and electro-magnet for alternately shifting the bar in opposite directions, an additional bar connecting such rails and provided with apertures, a spring-actuated bolt for locking the latter bar, an armature fixedly and directly secured to the said locking-bar, and a separate and independent magnet directly controlling such armature, substantially as herein shown and described.

DANIEL S. McELROY.

Witnesses:
GEO. M. HOPKINS,
C. SEDGWICK.